United States Patent [19]

Alewelt et al.

[11] 4,346,210

[45] Aug. 24, 1982

[54] PROCESS FOR THE PREPARATION OF POLYCARBONATES CATALYZED BY CYCLIC AZA COMPOUNDS

[75] Inventors: Wolfgang Alewelt; Dieter Margotte; Claus Wulff; Hugo Vernaleken, all of Krefeld, Fed. Rep. of Germany

[73] Assignee: Bayer Aktiengesellschaft, Leverkusen, Fed. Rep. of Germany

[21] Appl. No.: 88,694

[22] Filed: Oct. 26, 1979

Related U.S. Application Data

[63] Continuation-in-part of Ser. No. 931,695, Aug. 7, 1978, abandoned.

[30] Foreign Application Priority Data

Aug. 9, 1977 [DE] Fed. Rep. of Germany ....... 2735775

[51] Int. Cl.³ .............................................. C08L 69/00
[52] U.S. Cl. .................................... 528/199; 528/126; 528/171
[58] Field of Search ............... 528/199, 196, 198, 126, 528/171; 260/463

[56] References Cited

U.S. PATENT DOCUMENTS

| | | | |
|---|---|---|---|
| 3,220,975 | 11/1965 | Fox | 260/47 |
| 3,275,601 | 9/1966 | Schnell et al. | 260/47 |
| 3,428,600 | 2/1969 | Sullivan et al. | 260/47 |
| 3,787,359 | 1/1974 | Horn et al. | 260/47 XA |
| 3,794,629 | 2/1974 | Eimers et al. | 260/45.8 A |
| 3,945,969 | 3/1976 | Horn et al. | 260/47 XA |
| 4,025,489 | 5/1977 | Bailey et al. | 260/47 XA |
| 4,038,252 | 7/1977 | Vernaleken et al. | 260/47 XA |
| 4,073,769 | 2/1978 | Eimers et al. | 260/45.8 R |

FOREIGN PATENT DOCUMENTS

| | | |
|---|---|---|
| 959497 | 3/1957 | Fed. Rep. of Germany . |
| 1046311 | 12/1958 | Fed. Rep. of Germany . |
| 1128653 | 4/1962 | Fed. Rep. of Germany . |
| 2447349 | 4/1976 | Fed. Rep. of Germany . |
| 2510463 | 9/1976 | Fed. Rep. of Germany . |
| 1072161 | 6/1967 | United Kingdom . |
| 1156222 | 6/1969 | United Kingdom . |

OTHER PUBLICATIONS

Chemisches Zentralblatt; Abstract No. 32–2837, 1965 (p. 10098) Oba et al.
Oba et al., Jap. A. S. 11447/1962, 8/1962, 1 page.

*Primary Examiner*—Theodore E. Pertilla
*Attorney, Agent, or Firm*—Gene Harsh; Lawrence S. Pope; Aron Preis

[57] ABSTRACT

The present invention relates to a process for the preparation of aromatic polycarbonates from diphenols by the phase boundary process, which is characterized in that cyclic, preferably monocyclic or bicyclic, aza compounds are used as catalysts. The present invention also relates to the polycarbonates obtainable according to the process, which are distinguished by high light transmission and a low tendency to yellowing, even after relatively severe exposure to heat.

5 Claims, No Drawings

PROCESS FOR THE PREPARATION OF POLYCARBONATES CATALYZED BY CYCLIC AZA COMPOUNDS

This application is a continuation-in-part of our co-pending application Ser. No. 931,695 filed Aug. 7, 1978, abandoned.

BACKGROUND OF THE INVENTION

Color stabilization of aromatic polycarbonates was hitherto preferably effected by adding additives, in particular phosphites (compare DT-AS (German published specification) No. 1,128,653 (Le 1,926), DT-AS (German published specification) No. 2,140,207, (LeA 13,917) which corresponds to U.S. Pat. No. 3,794,629 and DT-OS (German published specification) No. 2,255,639 (LeA 14,709) which corresponds to U.S. Pat. No. 4,073,769), optionally in combination with other additives, such as, for example with oxethane compounds (DT-OS (German published specification) No. 2,510,463 (LeA 16,231).

Compared with these methods for color stabilization of polycarbonates, the method according to the invention uses a completely different principle in that cyclic aza compounds are used as catalysts in the preparation of polycarbonates by the two-phase boundary polycondensation process (compare German patent specification No. 959,497 (Le 1,693), German patent specification No. 1,046,311 (Le 1,747) and German patent specification No. 2,410,716 (LeA 15,514) which corresponds to U.S. Pat. No. 4,038,252).

SUMMARY OF THE INVENTION

The present invention relates to a process for the preparation of aromatic polycarbonates from diphenols by the phase boundary process, which is characterized in that cyclic, preferably monocyclic or bicyclic, aza compounds are used as catalysts. The present invention also relates to the polycarbonates obtainable according to the process, which are distinguished by high light transmission and a low tendency to yellowing, even after relatively severe exposure to heat.

DETAILED DESCRIPTION OF THE INVENTION

Suitable cyclic aza compounds are, in particular, monocyclic and bicyclic aza compounds, and of these, in turn, those of the pyrrolidine type, piperidine type and morpholine type are preferred. The cyclic aza compounds preferably have between 4 and 20 C-atoms, in particular between 5 and 12 C atoms.

From about 0.01 to 10 mol %, preferably from about 0.05 to 5 mol % and most preferably from about 0.05 to 2 Mol %, relative to mols of diphenols employed, of cyclic aza compounds are employed according to the invention. Cyclic aza compounds in the sense of instant invention are those which neither have a double bond at the aza-nitrogen-atom nor any secondary amine structure. Moreover the cyclic aza compounds do not have substituents which are reactive during the synthesis of the polycarbonates according to the phase boundary process.

The following individual compounds are mentioned as examples: N-$C_1$–$C_6$-alkyl-pyrrolidines, N-$C_1$–$C_6$-alkyl-piperidines, N-$C_1$–$C_6$-alkyl-morpholines, N-$C_1$–$C_6$-alkyl-dihydroindoles, N-$C_1$–$C_6$-alkyl-dihydroisoindoles, N-$C_1$–$C_6$-alkyl-tetrahydroquinolines, N-$C_1$–$C_6$-alkyl-tetrahydroisoquinolines and N-$C_1$–$C_6$-alkyl-benzomorpholines, 1-azabicyclo-[3,3,0]-octane, 1-azabicyclo-(2,2,2)-octane, N-$C_1$–$C_6$-alkyl-2-azabicyclo-(2.2.1)-octane, N-$C_1$–$C_6$-alkyl-2-azabicyclo-[3,3,1]-nonane and N-$C_1$–$C_6$-alkyl-3-azabicyclo[3,3,1]-nonane.

Particularly suitable compounds are: N-ethylpyrrolidine, N-ethylpiperidine, N-ethylmorpholine, N-isopropylpiperdine and N-isopropylmorpholine.

The preparation according to the invention of the high-molecular polycarbonates is effected by the phase boundary process. For this, diphenols, in particular dihydroxydiarylalkanes or -cycloalkanes, those which are substituted in the o-position relative to the phenolic hydroxyl groups also being suitable, in addition to the unsubstituted dihydroxydiarylalkanes or -cycloalkanes, are dissolved in an aqueous-alkaline phase and a solvent which is suitable for the polycarbonate is added. Phosgene is then passed in at a temperature between about 0° and 100° C. and a pH value between about 9 and 14. After the phosgenation, the polycondensation reaction is effected. The addition of the cyclic aza compounds as the catalyst can take place either before passing in the phosgene or after passing in the phosgene and before the polycondensation reaction. The times for the introduction of phosgene are between about 1 and 60 minutes and the post-condensation reaction takes between about 2 and 120 minutes. In order to isolate the finished polycarbonates, the organic polymer solution is separated off and washed with water until free from electrolytes. The polycarbonate can then be isolated by evaporating off the solvent or by precipitating with non-solvents, such as, for example, methanol or benzine. Further discussion and details of the phase boundary process are found in the text "Chemistry and Physics of Polycarbonates" by Hermann Schnell, Interscience Publishers, New York, 1964.

The polycarbonates prepared by the process according to the invention can also be branched in a known manner.

The polycarbonates obtainable according to the invention have average weight molecular weights ($\overline{M}_w$=weight average) between about 10,000 and 200,000, preferably between about 20,000 and 100,000, which can be determined from the relative viscosity of the polycarbonates (measured in methylene chloride at 25° C., and at a concentration of 0.5% by weight).

Examples of suitable diphenols are hydroquinone, resorcinol, 4,4'-dihydroxydiphenyl, bis-(hydroxyphenyl)alkanes, such as, for example, $C_1$–$C_8$-alkylene-or $C_2$–$C_8$-alkylidene-bis-phenols, bis-(hydroxyphenyl)-cycloalkanes, such as, for example, $C_5$–$C_6$-cycloalkylene- or $C_5$–$C_6$-cycloalkylidene-bisphenols, and bis-(hydroxyphenyl)sulphides, ethers, ketones, sulphoxides or sulphones. Furthermore, α,α'-bis-(hydroxyphenyl)-diisopropylbenzenes and the corresponding nuclear-alkylated and nuclear-halogenated compounds. Polycarbonates based on 2,2-bis-(4-hydroxy-phenyl)-propane (bisphenol A), 2,2-bis-(4-hydroxy-3,5-dichlorophenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethyl-phenyl)-propane (tetramethyl bisphenol A), 2,2-bis-(4-hydroxy-3-methyl-phenyl)-propane and 1,1-bis-(4-hydroxyphenyl)-cyclohexane (bisphenol Z) and those based on trinuclear bisphenols, such as α,α'-bis-(4-hydroxyphenyl)-p-diisopropylbenzene are preferred.

Further diphenols which are suitable for the preparation of polycarbonates are described in U.S. Pat. Nos.

3,028,264, 2,999,835, 3,148,172, 3,271,368, 2,991,273, 3,271,367, 3,280,278, 3,014,891, 2,999,846 and 3,879,348, all incorporated herein by reference, and German Offenlegungsschriften (German published specifications) Nos. 2,063,050 (LeA 13,359) 2,063,052 (LeA 13,425), 2,211,957 (LeA 14,240) and 2,211,956 (LeA 14,249).

EXAMPLES

The starting materials used in the Examples which follow are characterized as follows: (parts=parts by weight):

1. Process 1: (Phosgenation in methylene chloride) Discontinuous (batch) preparation of a polycarbonate 456 parts of 2,2-bis-(4-hydroxyphenyl)-propane and 9.5 parts of p-tert.-butylphenol are suspended in 1.5 liters of water. The oxygen is removed from the reaction mixture in a three-necked flask, provided with a stirrer and gas inlet tube, by passing nitrogen through the reaction mixture for 15 minutes, while stirring. 355 parts of 45% strength sodium hydroxide solution and 1,000 parts of methylene chloride are then added. The mixture is cooled to 25° C. While maintaining this temperature by cooling, 237 parts of phosgene are added during a period of 60 minutes. An additional 75 parts of 45% strength sodium hydroxide solution is added 15 and 30 minutes after the absorption of phosgene has started. The catalyst (see Examples) is added to the solution formed and the mixture is stirred for a further 15 minutes. A highly viscous solution is obtained, the viscosity of which is regulated by adding methylene chloride. The aqueous phase is separated off. The organic phase is washed with water until free from salts and alkali. Polycarbonate is isolated from the washed solution and dried. The polycarbonate has a relative viscosity of 1.30–1.31, measured in a 0.5% strength solution in methylene chloride at 20° C. This approximately corresponds to a molecular weight of about 34,000. The polycarbonate thus obtained is extruded and granulated.

2. Process 2: (Phosgenation in chlorobenzene) Continuous preparation of a polycarbonate The following solutions are pumped into a circulatory reactor with a reaction volume of 4.25 liters, such as is described in DT-AS (German published specification) No. 2,410,716 and U.S. Pat. No. 4,038,252:

1. 91.2 parts/hour of an alkali metal salt solution of bisphenol A, having the following composition: 130 parts of bisphenol A, 631 parts of water, 103.2 parts of 45% strength sodium hydroxide solution, 0.05 part of sodium borohydride, 2.3 parts of p-tert.-butylphenol and a catalyst (see Examples);
2. 6.7 parts/hour of phosgene with 88 parts/hour of chlorobenzene; and
3. 0.5 part/hour of 45% strength sodium hydroxide solution.

The reaction temperature is 72° C.; the concentration of the OH ions in the aqueous reaction phase is 0.08% strength. The average residence time is 1.4 minutes.

Further sodium hydroxide solution is added to the emulsion flowing out of the circulatory reactor in order to increase the OH concentration to 0.3 to 0.35% strength. The further condensation of the oligocarbonate is carried out in a reaction tube, such as is described in DT-OS (German published specification) No. 1,920,302 or U.S. Pat. No. 3,674,740. The average residence time is 4 mintues; the temperature is 83° C.

The aqueous reaction phase contains 0.32% of OH and 0.51% of $CO_3$; bisphenol cannot be detected.

the polycarbonate solution, the solids content of which is 15.1%, is washed until free from electrolytes, evaporated and isolated via a devolatilization extruder. The polycarbonate has a relative viscosity of 1.30 to 1.31, measured in a 0.5% strength solution in methylene chloride at 20° C. This approximately corresponds to a molecular weight of about 34,000.

The following catalysts are employed for the preparation of the polycarbonate in the following Examples:

EXAMPLE 1 (COMPARISON EXAMPLE)

1.6 parts of triethylamine, Process 1

EXAMPLE 2 (COMPARISON EXAMPLE)

0.575 part of triethylamine, Process 2

EXAMPLE 3

1.8 parts of N-ethylpiperidine, Process 1

EXAMPLE 4

0.31 part of N-isopropylpiperidine, Process 2

EXAMPLE 5

1.8 parts of N-ethylmorpholine, Process 1

EXAMPLE 6

1.0 part of N-ethylpyrrolidine, Process 1

EXAMPLE 7

0.8 part of quinuclidine respectively 1-azabicyclo-(2,2,2)-octane, Process 1

EXAMPLE 8

0.45 part of N-isopropylmorpholine, Process 2

EXAMPLE 9

A polycarbonate of 95 mol % of bisphenol A and 5 mol % of tetrabromobisphenol A, which is prepared by Process 1 using 1.5 parts of triethylamine and has a relative viscosity of 1.32.

EXAMPLE 10

The polycarbonate from Example 9, prepared by Process 1 using 0.6 part of N-ethylpiperidine.

The polycarbonates were processed to test pieces. The test pieces are annealed at 140° C. in a drying cabinet. The light transmission according to DIN 5,033 and DIN 4,646 was measured with the aid of a spectrophotometer. The decrease in the light transmission at 420 nm in the course of the heat treatment is a measure of the increasing discloration of the test piece.

TABLE

Light transmission of the polycarbonate test bars at 420 nm with a sheet thickness of 4 mm after annealing at 140° C.

| Polycarbonate from Example | Annealing | | | |
|---|---|---|---|---|
| | 0 days | 6 days | 12 days | 21 days |
| 1 (Comparison) | 83.0 | 82.7 | 82.2 | 81.3 |
| 2 (Comparison) | 83.5 | 83.1 | 82.2 | 81.2 |
| 3 | 86.0 | 85.9 | 85.4 | 85.0 |
| 4 | 86.5 | 86.0 | 85.7 | 85.1 |
| 5 | 85.9 | 85.7 | 85.1 | 84.8 |
| 6 | 85.8 | 85.5 | 85.0 | 84.6 |
| 7 | 86.7 | 86.4 | 86.0 | 85.3 |
| 8 | 86.2 | 86.1 | 85.7 | 85.0 |
| 9 (Comparison) | 80.3 | 80.0 | 79.5 | 78.6 |
| 10 | 82.0 | 81.9 | 81.5 | 81.1 |

Although the invention has been described in detail for the purpose of illustration, it is to be understood that such detail is solely for that purpose and that variations can be made therein by those skilled in the art without departing from the spirit and scope of the invention except as it may be limited by the claims.

CIP DISCLOSURE

The particularly suitable cyclic aza compounds according instant invention have moreover excellent catalytic activity as approved by the standard criteria for catalytic activity of the phase boundary process. These standard criteria are the amount of phenolic OH-end groups in the resulting polycarbonate, the saponifiable chlorine content of the resulting polycarbonate, which both should be as low as possible; moreover the relative viscosity of the resulting polycarbonate which is a criterium for their molecular weight, is also an index for the activity of the catalyst, and also the amount of non-reacted bisphenol remaining in the aqueous phase. Further details for the catalytic activity is described in US-PS 4038252 and in "Interfacial Synthesis," Volume II, Polymer Application and Technology, edited by Frank Millich, Marcel Dekker, INC., New York and Basel, 1977, pages 83 to 87.

Examples 11a to 11h

According to process 1 of the Examples mentioned before polycarbonates 11a, 11b, 11c, 11d, 11e, 11f, 11g and 11h from 2.2-bis-(4-hydroxyphenyl)-propane have been prepared using the following catalysts N-ethylpiperidine N-ethylmorpholine, N-methylpiperidine, N-methylmorpholine, N-phenylmorpholine, N-ethylpyrrolidine, N-isopropylpiperidine, N-triethylamine in equal mol % amounts, referred to the mols of 2.2-bis-(4-hydroxyphenyl)-propane employed, and also under otherwise the same reaction conditions. The resulting polycarbonates have the following properties:

| amine 1,25 mol % | | (1) | (2) | (3) | (4) |
|---|---|---|---|---|---|
| 11a | N-ethylpiperidine | 0.009 | <0.001 | 1.296 | 0.12 |
| 11b | N-ethylmorpholine | 0.04 | <0.001 | 1.246 | 0.44 |
| 11c | N-methylpiperidine | 0.16 | 0.001 | 1.18 | 0.8 |
| 11d | N-methylmorpholine | 0.50 | 0.008 | 1.10 | 0.8 |
| 11e | N-phenylmorpholine | 0.0035 | 0.28 | 1.12 | 0.006 |
| 11f | N-ethylpyrrolidine | 0.04 | 0.002 | 1.284 | 0.03 |
| 11g | N-isopropylpiperidine | 0.01 | 0.003 | 1.280 | 0.02 |
| 11h | N-triethylamine | 0.013 | <0.002 | 1.286 | 0.1 |

(1) Phenolic OH—endgroups (% by weight referred to polycarbonate).
(2) Saponifiable chlorine (% by weight referred to polycarbonate).
(3) Relative viscosity $\gamma$ rel, measured at 20° C. in $CH_2Cl_2$ in a concentration of 5 g/l.
(4) Amount of bisphenol non-reacted (% by weight referred to polycarbonate).

What is claimed is:

1. In the process for the production of an aromatic polycarbonate by a phase boundary process the improvement comprising the introduction of a cyclic aza compound selected from the group consisting of N-ethyl pyrrolidine, N-ethylpiperidine, N-ethylmorpholine, N-isopropylpiperidine and N-isopropylmorpholine as a catalyst.

2. The process according to claim 1 wherein the cyclic aza compound is used in an amount of from about 0.01 to 10 mol %, relative to the mols of diphenols employed.

3. The process according to claim 2 wherein the cyclic aza compound is used in an amount of from about 0.05 to 5 mol %, relative to the mols of diphenols employed.

4. The process of claim 1 wherein the aromatic polycarbonate has a weight average molecular weight $M_w$, of between about 10,000 and 200,000.

5. The process of claim 1 wherein the cyclic aza compound is N-ethylpiperidine.

* * * * *